(12) United States Patent  
Ikeda

(10) Patent No.: US 8,634,031 B2  
(45) Date of Patent: Jan. 21, 2014

(54) REMOTE CONTROL TERMINAL AND INFORMATION PROCESSING APPARATUS

(75) Inventor: Yasuhisa Ikeda, Chiba (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 13/493,427

(22) Filed: Jun. 11, 2012

(65) Prior Publication Data

US 2012/0327309 A1 Dec. 27, 2012

(30) Foreign Application Priority Data

Jun. 24, 2011 (JP) ................................ 2011-140711

(51) Int. Cl.  
*H04N 5/44* (2011.01)  
*H04N 5/63* (2006.01)  
*H04N 5/232* (2006.01)  
*H04N 7/173* (2011.01)  
*G05B 11/01* (2006.01)

(52) U.S. Cl.  
USPC ........ 348/734; 348/730; 348/211.2; 725/106; 340/12.22

(58) Field of Classification Search  
None  
See application file for complete search history.

(56) References Cited

U.S. PATENT DOCUMENTS

| 6,529,233 | B1* | 3/2003 | Allen ........................ 348/211.2 |
| 2002/0149705 | A1* | 10/2002 | Allen et al. .................... 348/734 |
| 2010/0060477 | A1* | 3/2010 | Laasik et al. ............. 340/825.69 |
| 2010/0064328 | A1* | 3/2010 | Laasik et al. ................. 725/106 |
| 2010/0118209 | A1* | 5/2010 | Hardacker ..................... 348/734 |
| 2011/0025921 | A1* | 2/2011 | Morioka et al. ............... 348/730 |
| 2012/0051546 | A1 | 3/2012 | Tsurumoto |

FOREIGN PATENT DOCUMENTS

| GB | 2463107 A | 3/2010 |
| JP | 2010-272984 A | 12/2010 |
| JP | 2011-034294 A | 2/2011 |
| WO | 0230116 A1 | 4/2002 |

OTHER PUBLICATIONS

Partial European Search Report EP 12172169, dated Oct. 22, 2012.  
Fatboislimm: "Use Phone as Bluetooth Headset for Tablet", Nov. 19, 2010, XP 055045958, Retrieved from the Internet: URL:http://forum.xda-developers.com/showthread.php?t=844605.  
European Search Report from EP Application No. 12172169, dated Dec. 13, 2012.

* cited by examiner

*Primary Examiner* — Jefferey Harold  
*Assistant Examiner* — Sean Haiem  
(74) *Attorney, Agent, or Firm* — Lerner, David, Littenberg, Krumholz & Mentlik, LLP

(57) ABSTRACT

Provided is a remote control terminal, including: a first terminal-side wireless-communication unit configured to interactively communicate with a control-target information processing apparatus by using a first wireless communication system, to control the information processing apparatus; a second terminal-side wireless-communication unit configured to interactively communicate with the information processing apparatus by using a second wireless communication system, the second wireless communication system being higher in speed than the first wireless communication system; a camera unit configured to obtain video data; and a first controller configured to control the second terminal-side wireless-communication unit to transmit the video data obtained by the camera unit to the information processing apparatus by using the second wireless communication system.

19 Claims, 10 Drawing Sheets

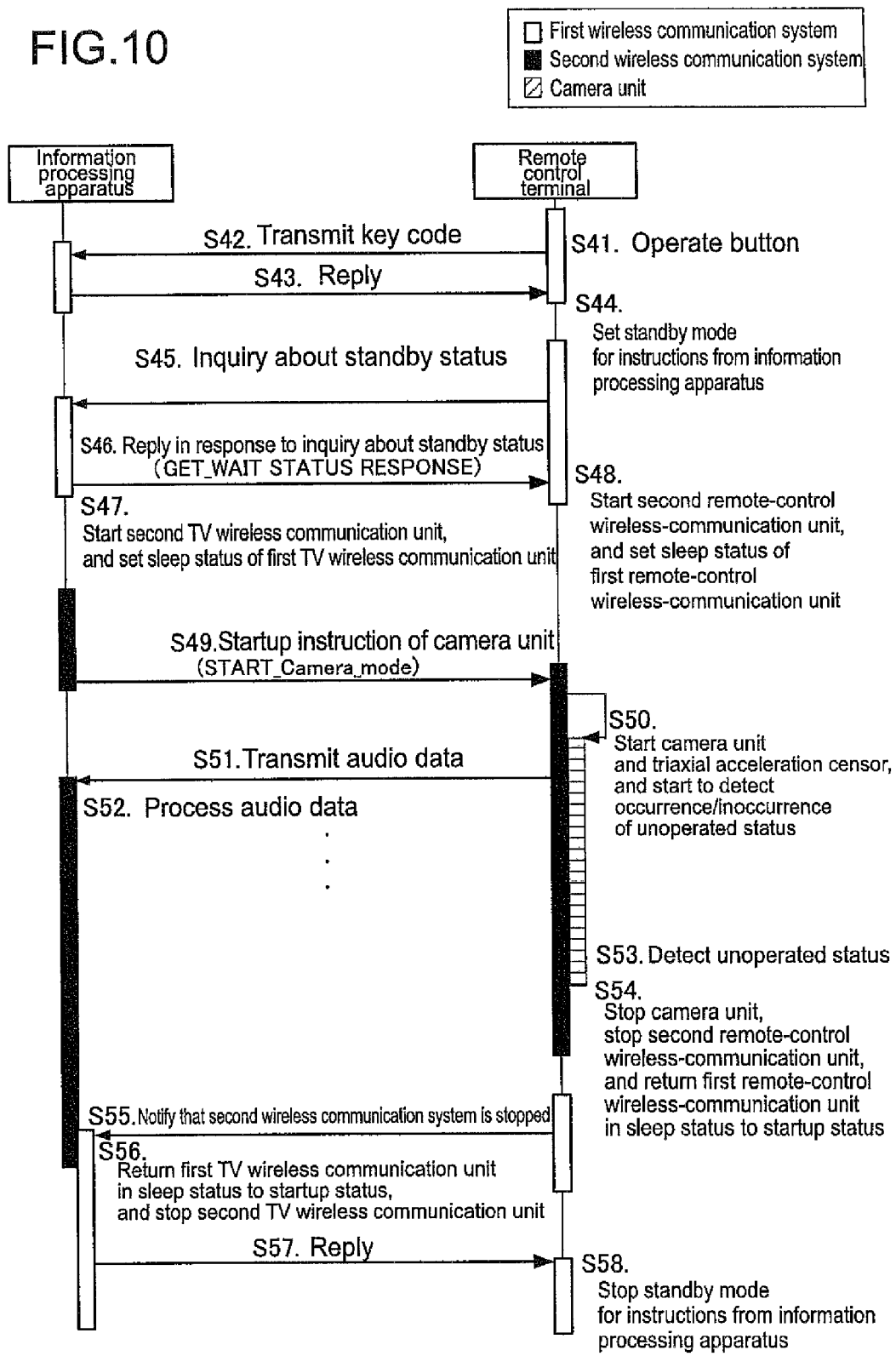

REMOTE CONTROL TERMINAL AND INFORMATION PROCESSING APPARATUS

The present application claims priority from Japanese Patent Application No. JP 2011-140711 filed in the Japanese Patent Office on Jun. 24, 2011, the entire content of which is incorporated herein by reference.

BACKGROUND

The present disclosure relates to a wireless remote control terminal capable of remote-controlling an information processing apparatus such as a television receiver through interactive wireless communication, and to an information processing apparatus remote-controlled by the remote control terminal.

In the field of remote control terminals for remote-controlling an information processing apparatus such as a television receiver, infrared remote controls using infrared communications are the mainstream. However, an infrared ray from the infrared remote control has high directivity. Because of this, it is necessary for a user to direct an infrared light emitting section of the remote control toward a control-target apparatus. To the contrary, a radio wave has relatively low directivity. In view of this, recently, RF (Radio frequency) remote controls using high-frequency radio waves have been developed and are becoming the mainstream. Further, some organizations attempt to standardize the standard of RF remote controls.

For example, ZigBee (registered trademark) is the standard of the specification of the network layer, the security layer, and the application layer. ZigBee (registered trademark) is in conformity with the near field communication standard IEEE (registered trademark) (Institute of Electrical and Electronics Engineers) 802.15.4, and is a higher-level system of IEEE (registered trademark) 802.15.4. Further, based on IEEE (registered trademark) 802.15.4., an industry organization has standardized, as a RF remote control standard, ZigBee (registered trademark) RF4CE (Radio frequency for Consumer Electronics).

For example, each of Japanese Patent Application Laid-open No. 2011-034294 (hereinafter, referred to as Patent Document 1) and Japanese Patent Application Laid-open No. 2010-272984 (hereinafter, referred to as Patent Document 2) discloses a technology of a control terminal controlling an information processing apparatus such as a television receiver by using RF radio signals such as RF4CE.

SUMMARY

Meanwhile, recently, information processing apparatuses such as television receivers have extremely large number of functions. For example, some television receivers are capable of connecting to the Internet and accessing various services in the Internet. RF remote controls include keyboards. Such a keyboard is operated by a user, and data such as character strings is input in the RF remote control. The RF remote control is capable of transmitting such data to the control-target apparatus successfully. As described above, according to the RF remote controls, the possibility that information processing apparatuses such as television receivers access various services in the Internet is increased.

On the other hand, there are many kinds of services in the Internet. For example, in some services, an arbitrary given image is recognized, and, based on the recognized data, information in relation with the image is searched for. Further, information processing apparatuses such as television receivers have extremely large number of functions in themselves. In such circumstances, some weak points of RF remote controls are being revealed.

In view of the above-mentioned circumstances, it is desirable to provide a remote control terminal, which may support various services in the Internet and multiple functions of a control-target apparatus. It is also desirable to provide an information processing apparatus capable of being used in combination with the remote control terminal.

According to a first aspect of the present technology, there is provided a remote control terminal, including: a first terminal-side wireless-communication unit configured to interactively communicate with a control-target information processing apparatus by using a first wireless communication system, to control the information processing apparatus; a second terminal-side wireless-communication unit configured to interactively communicate with the information processing apparatus by using a second wireless communication system, the second wireless communication system being higher in speed than the first wireless communication system; a camera unit configured to obtain video data; and a first controller configured to control the second terminal-side wireless-communication unit to transmit the video data obtained by the camera unit to the information processing apparatus by using the second wireless communication system.

The remote control terminal may successfully transmit video data obtained by the camera unit to the information processing apparatus being a control-target apparatus by using the second wireless communication system. The second wireless communication system is higher in speed than the first wireless communication system, which is suitable for a control-dedicated wireless communication. As a result, for example, real-time transmission of video data from the remote control terminal to the information processing apparatus may be realized.

In the remote control terminal according to this technology may further include: an input unit configured to receive, from a user, an input of an instruction to execute processing of the video data obtained by the camera unit. The first controller is configured to control the first terminal-side wireless-communication unit to send, in response to the input from the user, a request to the information processing apparatus to use the second wireless communication system, via the first wireless communication system, and to receive a first startup instruction replied from the information processing apparatus via the first wireless communication system, and to start the second terminal-side wireless-communication unit.

That is, it is necessary for the remote control terminal to obtain the first startup instruction from the information processing apparatus in order to start the second terminal-side wireless-communication unit. Because of this, in a case where, when a power is not supplied to the information processing apparatus, or when wireless communications with the information processing apparatus is not established, the input unit is erroneously operated by a user, the second terminal-side wireless-communication unit is not started. Therefore, unnecessary power consumption may be reduced.

The first controller may be configured to control the second terminal-side wireless-communication unit to receive a second startup instruction via the second wireless communication system, the second startup instruction being generated by the information processing apparatus after generating the first startup instruction, and to start the camera unit. Because of this, in order to start the camera unit, it is necessary for the remote control terminal to obtain the second startup instruction from the information processing apparatus. Because of this, in a case where, when a power is not supplied to the information processing apparatus, or when wireless communications with the information processing apparatus is not established, the input unit is erroneously operated by a user, the second terminal-side wireless-communication unit and, in addition, the camera unit are not started. Therefore, unnecessary power consumption may further be reduced.

In the remote control terminal according to this technology, the first controller may be configured to set a sleep status of the first terminal-side wireless-communication unit, in a case where the first controller starts the second terminal-side wireless-communication unit. Because of this, unnecessary power consumption in the first terminal-side wireless-communication unit may also be reduced.

The first controller may be configured to control the second terminal-side wireless-communication unit to receive a stop instruction via the second wireless communication system, the stop instruction being generated by the information processing apparatus, to stop the second terminal-side wireless-communication unit and the camera unit, and to return the first terminal-side wireless-communication unit in the sleep status to a startup status. In a case where a user forgets to stop the second terminal-side wireless-communication unit and the camera unit after the second terminal-side wireless-communication unit completes transmission of video data, the information processing apparatus is capable of automatically stopping the second terminal-side wireless-communication unit and the camera unit. As a result, unnecessary power consumption may also be reduced.

The remote control terminal according to this technology may further include: a motion detection unit configured to detect a motion of the remote control terminal. The first controller is configured to determine an unoperated status of the remote control terminal based on a detection result by the motion detection unit, and to control the second terminal-side wireless-communication unit to send, in a case where the unoperated status is determined, a notification to the information processing apparatus such that the information processing apparatus sends the stop instruction, via the second wireless communication system. As a result, in the status where the remote control terminal is connected with the information processing apparatus via the second wireless communication system and where the remote control terminal is unoperated, the power consumption may be minimized.

According to a second aspect of the present technology, there is provided a remote control terminal, including: a first terminal-side wireless-communication unit configured to interactively communicate with a control-target information processing apparatus by using a first wireless communication system, to control the information processing apparatus; a second terminal-side wireless-communication unit configured to interactively communicate with the information processing apparatus by using a second wireless communication system, the second wireless communication system being higher in speed than the first wireless communication system; a microphone unit configured to obtain audio data; and a first controller configured to control the second terminal-side wireless-communication unit to transmit the audio data obtained by the microphone unit to the information processing apparatus by using the second wireless communication system.

The remote control terminal may successfully transmit audio data obtained by the microphone unit to the information processing apparatus being a control-target apparatus by using the second wireless communication system. The second wireless communication system is higher in speed than the first wireless communication system, which is suitable for a control-dedicated wireless communication. As a result, for example, real-time transmission of audio data from the remote control terminal to the information processing apparatus may be realized.

The remote control terminal may further include: an input unit configured to receive, from a user, an instruction to transmit the audio data obtained by the microphone unit to the information processing apparatus by using the second wireless communication system. The first controller is configured to control the first terminal-side wireless-communication unit to send, in response to the instruction from the user, a request to the information processing apparatus via the first wireless communication system, and to receive a third startup instruction replied from the information processing apparatus via the first wireless communication system, and to start the second terminal-side wireless-communication unit.

It is necessary for the remote control terminal to obtain the third startup instruction from the information processing apparatus in order to start the second terminal-side wireless-communication unit. Because of this, in a case where, when a power is not supplied to the information processing apparatus, or when wireless communications with the information processing apparatus is not established, the input unit is erroneously operated by a user, the second terminal-side wireless-communication unit is not started. Therefore, unnecessary power consumption may be reduced.

The first controller may be configured to control the second terminal-side wireless-communication unit to receive a fourth startup instruction via the second wireless communication system, the fourth startup instruction being generated by the information processing apparatus after generating the third startup instruction, and to start the microphone unit. Because of this, in order to start the microphone unit, it is necessary for the remote control terminal to obtain the fourth startup instruction from the information processing apparatus. Because of this, in a case where, when a power is not supplied to the information processing apparatus, or when wireless communications with the information processing apparatus is not established, the input unit is erroneously operated by a user, the second terminal-side wireless-communication unit and, in addition, the microphone unit are not started. Therefore, unnecessary power consumption may further be reduced.

The first controller may be configured to set a sleep status of the first terminal-side wireless-communication unit, in a case where the first controller starts the second terminal-side wireless-communication unit. Because of this, unnecessary power consumption in the first terminal-side wireless-communication unit may also be reduced.

The first controller may be configured to control the second terminal-side wireless-communication unit to receive a stop instruction via the second wireless communication system, the stop instruction being generated by the information processing apparatus, to stop the second terminal-side wireless-communication unit and the microphone unit, and to return the first terminal-side wireless-communication unit in the sleep status to a startup status. In a case where a user forgets to stop the second terminal-side wireless-communication unit and the microphone unit after the second terminal-side wireless-communication unit completes transmission of audio data, the information processing apparatus is capable of automatically stopping the second terminal-side wireless-communication unit and the microphone unit. As a result, unnecessary power consumption may also be reduced.

The remote control terminal according to this technology may further include: a motion detection unit configured to detect a motion of the remote control terminal. The first controller is configured to determine an unoperated status of the remote control terminal based on a detection result by the motion detection unit, and to control the second terminal-side wireless-communication unit to send, in a case where the unoperated status is determined, a notification to the information processing apparatus such that the information processing apparatus sends the stop instruction, via the second wireless communication system. As a result, in the status where the remote control terminal is connected with the information processing apparatus via the second wireless communication system and where the remote control terminal is unoperated, the power consumption may be minimized.

According to a third aspect of the present technology, there is provided an information processing apparatus, including: a first apparatus-side wireless-communication unit configured to interactively communicate with a remote control terminal by using a first wireless communication system, to be controlled by the remote control terminal; a second apparatus-side wireless-communication unit configured to interactively communicate with the remote control terminal by using a second wireless communication system, the second wireless communication system being higher in speed than the first wireless communication system; and a second controller configured to control the first apparatus-side wireless communication unit to receive a request to use the second wireless communication system sent from the remote control terminal, the remote control terminal sending the request when the remote control terminal receives, as a trigger, from a user, an input of an instruction to execute processing of video data obtained by a camera unit provided in the remote control terminal, and to send a first startup instruction to the remote control terminal to start the second terminal-side wireless-communication unit, via the first wireless communication system.

The information processing apparatus may receive video data obtained by the camera unit from the remote control terminal by using the second wireless communication system. The second wireless communication system is higher in speed than the first wireless communication system, which is suitable for a control-dedicated wireless communication. As a result, for example, real-time transmission of video data from the remote control terminal to the information processing apparatus may be realized. Further, it is necessary for the remote control terminal to obtain the first startup instruction from the information processing apparatus in order to start the second terminal-side wireless-communication unit of the remote control terminal. Because of this, in a case where, when a power is not supplied to the information processing apparatus, or when wireless communications with the information processing apparatus is not established, the input unit is erroneously operated by a user, the second terminal-side wireless-communication unit is not started. Therefore, unnecessary power consumption may be reduced.

The second controller may be configured to control the second apparatus-side wireless communication unit to send, after sending the first startup instruction, a second startup instruction to the remote control terminal to start the camera unit of the remote control terminal, via the second wireless communication system. Because of this, in order to start the camera unit, it is necessary for the remote control terminal to obtain the second startup instruction from the information processing apparatus. Because of this, in a case where, when a power is not supplied to the information processing apparatus, or when wireless communications with the information processing apparatus is not established, the input unit is erroneously operated by a user, the second terminal-side wireless-communication unit and, in addition, the camera unit are not started. Therefore, unnecessary power consumption may further be reduced.

The second controller may be configured to control the second apparatus-side wireless-communication unit to send, via the second wireless communication system, a stop instruction to the remote control terminal to stop, in a case where, when the information processing apparatus is connected with the remote control terminal via the second wireless communication system, a status, where the information processing apparatus fails to receive the video data from the remote control terminal, continues for a predetermined continuous time period, the second terminal-side wireless-communication unit and the camera unit of the remote control terminal, and to return the first terminal-side wireless-communication unit in the sleep status to a startup status. In a case where a user forgets to stop the second terminal-side wireless-communication unit and the camera unit of the remote control terminal after the second terminal-side wireless-communication unit completes transmission of video data, the information processing apparatus is capable of automatically stopping the second terminal-side wireless-communication unit and the camera unit. As a result, unnecessary power consumption may also be reduced.

The second controller may be configured to control the first apparatus-side wireless-communication unit to receive a request to use the second wireless communication system sent from the remote control terminal, the remote control terminal sending the request when the remote control terminal receives, as a trigger, from a user, an input of an instruction to execute processing of audio data obtained by a microphone unit provided in the remote control terminal, and to send a third startup instruction to the remote control terminal to start the second terminal-side wireless-communication unit, via the first wireless communication system. It is necessary for the remote control terminal to obtain the third startup instruction from the information processing apparatus in order to start the second terminal-side wireless-communication unit of the remote control terminal. Because of this, in a case where, when a power is not supplied to the information processing apparatus, or when wireless communications with the information processing apparatus is not established, the input unit is erroneously operated by a user, the second terminal-side wireless-communication unit is not started. Therefore, unnecessary power consumption may be reduced.

The second controller may be configured to control the second apparatus-side wireless communication unit to send, after sending the third startup instruction, a fourth startup instruction to the remote control terminal to start the microphone unit of the remote control terminal, via the second wireless communication system. Because of this, in order to start the microphone unit, it is necessary for the remote control terminal to obtain the fourth startup instruction from the information processing apparatus. Because of this, in a case where, when a power is not supplied to the information processing apparatus, or when wireless communications with the information processing apparatus is not established, the input unit is erroneously operated by a user, the second terminal-side wireless-communication unit and, in addition, the microphone unit are not started. Therefore, unnecessary power consumption may further be reduced.

The second controller may be configured to control the second apparatus-side wireless-communication unit to send, via the second wireless communication system, a stop instruction to the remote control terminal to stop, in a case where, when the information processing apparatus is connected with the remote control terminal via the second wireless communication system, a status, where the information processing apparatus fails to receive the audio data from the remote control terminal, continues for a predetermined continuous time period, the second terminal-side wireless-communication unit and the microphone unit of the remote control terminal, and to return the first terminal-side wireless-communication unit in the sleep status to a startup status. In a case where a user forgets to stop the second terminal-side wireless-communication unit and the microphone unit of the remote control terminal after the second terminal-side wireless-communication unit completes transmission of audio data, the information processing apparatus is capable of automatically stopping the second terminal-side wireless-communication unit and the microphone unit. As a result, unnecessary power consumption may also be reduced.

As described above, according to the present technology, a remote control terminal, which may support various services in the Internet and multiple functions of a control-target apparatus, may be provided. Further, an information processing apparatus capable of being used in combination with the remote control terminal may be provided.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 10 is a diagram showing a processing flow in a case where the video-dedicated application startup button 326 is operated under the condition in which prohibition of data transmission under an unoperated status is set.

DETAILED DESCRIPTION OF EMBODIMENTS

Hereinafter, an embodiment of the present disclosure will be described with reference to the drawings.

First Embodiment

Figure 1:
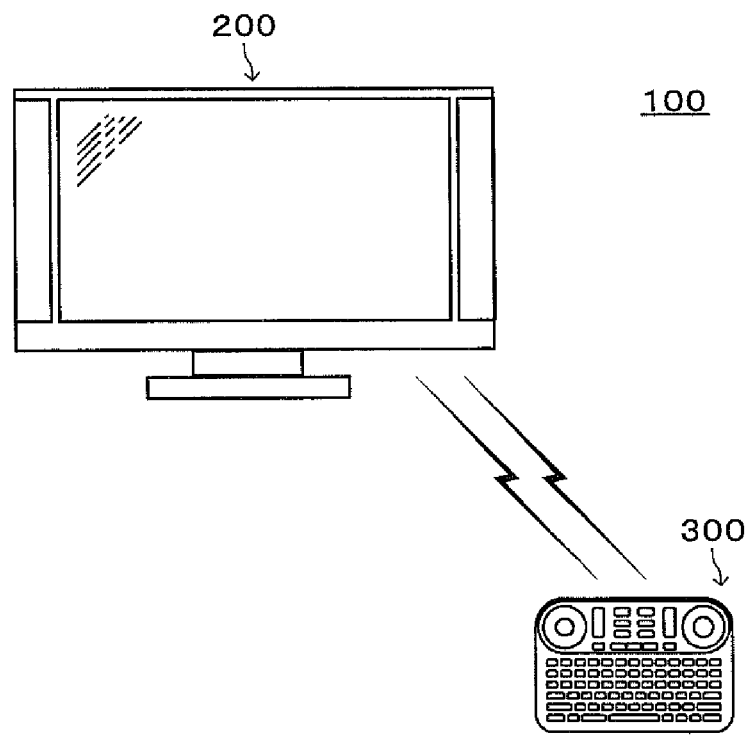
FIG. 1 is a block diagram showing the configuration of a remote control system according to a first embodiment of the present technology.

FIG. 1 is a block diagram showing the configuration of a remote control system according to a first embodiment of the present technology. As shown in FIG. 1, a remote control system 100 of this embodiment includes a control-target information processing apparatus 200, and a remote control terminal 300 for remote-controlling the information processing apparatus 200.

Figure 7:
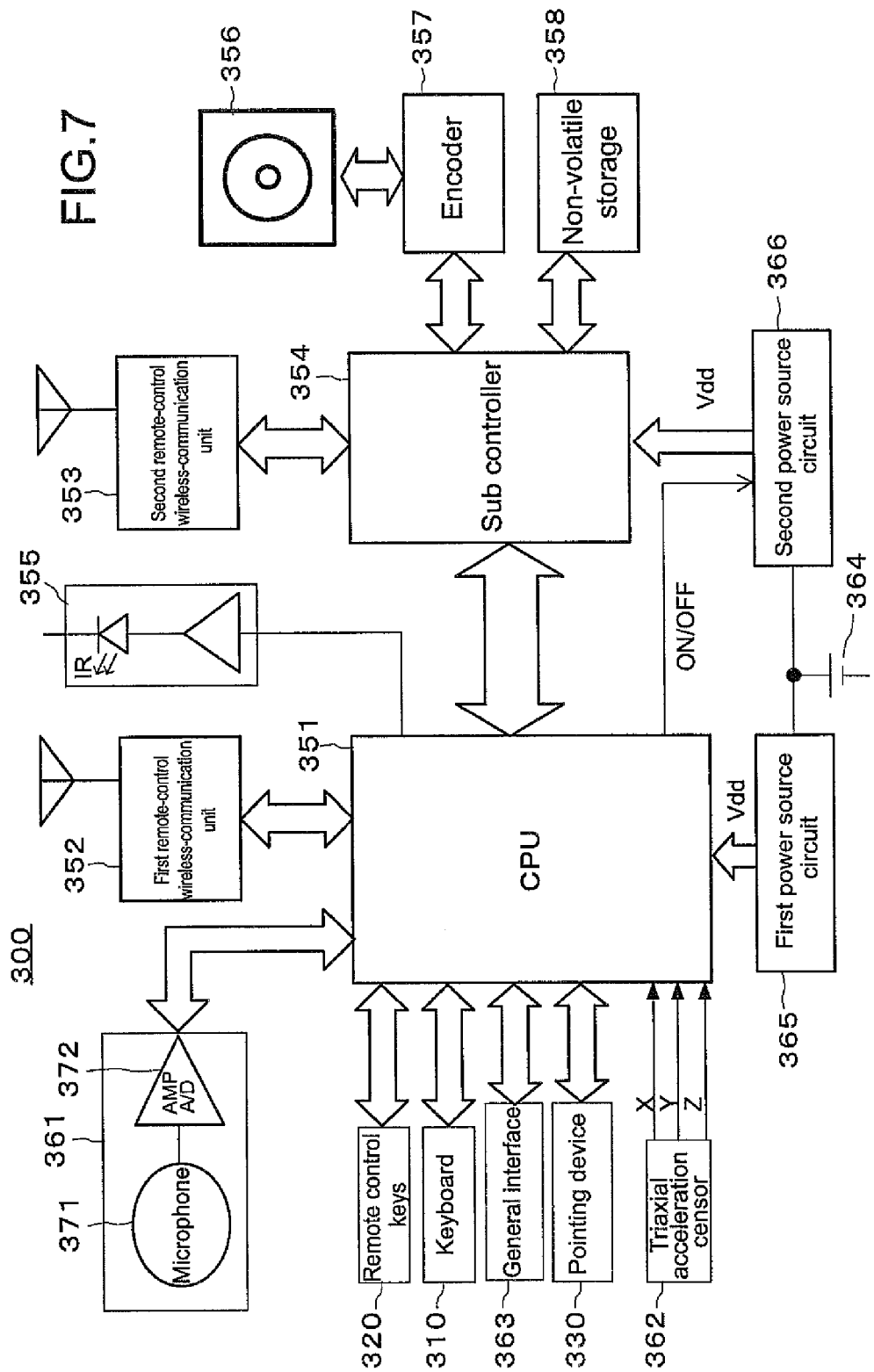
FIG. 7 is a diagram showing the hardware configuration of the remote control terminal of FIG. 3.

The remote control terminal 300 includes a camera unit (356 in FIG. 7). Operated by a user, the camera unit is capable of taking an image of an arbitrary subject. The remote control terminal 300 is capable of wirelessly transmitting video data obtained by using the camera unit to the information processing apparatus 200. Further, the remote control terminal 300 includes a microphone unit (361 in FIG. 7). Operated by a user, the remote control terminal 300 is capable of wirelessly transmitting audio data obtained by using the microphone unit to the information processing apparatus 200, similar to the case of the video data.

Application programs for performing processing on video data (hereinafter referred to as "video-dedicated application".) are installed in the information processing apparatus 200. Examples of the video-dedicated application include an application for displaying video data took by the camera unit of the remote control terminal 300 on a display, an application for accessing a service for recognizing an image in the video and searching for information about a recognized object, and the like.

Further, application programs for performing processing on audio data (hereinafter referred to as "audio-dedicated application".) are installed in the information processing apparatus 200. Examples of the audio-dedicated application include an application for outputting audio data collected by the microphone unit of the remote control terminal 300 from a speaker as sounds, an application for recognizing audio data and controlling the information processing apparatus 200, and the like.

Recently, in the field of wireless remote control, an RF (Radio frequency) remote control using high-frequency radio waves is becoming the mainstream. Specifically, RF4CE (Radio frequency for Consumer Electronics) and the like are used. RF4CE is the international standard of RF remote controls for consumer electronics. However, the theoretical value of RF4CE communication speed is 250 Kbps. Such a speed is enough for transmitting control signals and the like, but not enough for transmitting video data and audio data in real time.

According to this embodiment, the remote control system 100 includes a first wireless communication system and a second wireless communication system. The first wireless communication system is in conformity with a wireless communication standard using RF signals such as the RF4CE standard, for example. The second wireless communication system is high in speed than the first wireless communication system. The remote control system 100 appropriately switches between the first wireless communication system and the second wireless communication system, and use one of the first wireless communication system and the second wireless communication system. The second wireless communication system is required to be a wireless communication system high in speed than the first wireless communication system. As the second wireless communication system, for example, a wireless LAN in conformity with the IEEE 802.11b standard may be used. The nominal speed of the IEEE 802.11b standard is 11 Mbps, which is enough higher than the speed of RF4CE.

Note that, higher the speed, larger the power consumption. Because of this, it is not appropriate for a remote control terminal including a battery as a power source to employ a mode in which the wireless LAN is always operated and all the signals are transmitted via the wireless LAN. In view of this, according to this embodiment, the remote control system 100 appropriately switches between the first wireless communication system and the second wireless communication system to be operated, in order to reduce the total power consumption. Hereinafter, the remote control system 100 of this embodiment will be described in detail.

[Configuration of Information Processing Apparatus 200]

First, the configuration of the information processing apparatus 200 will be described.

Figure 2:
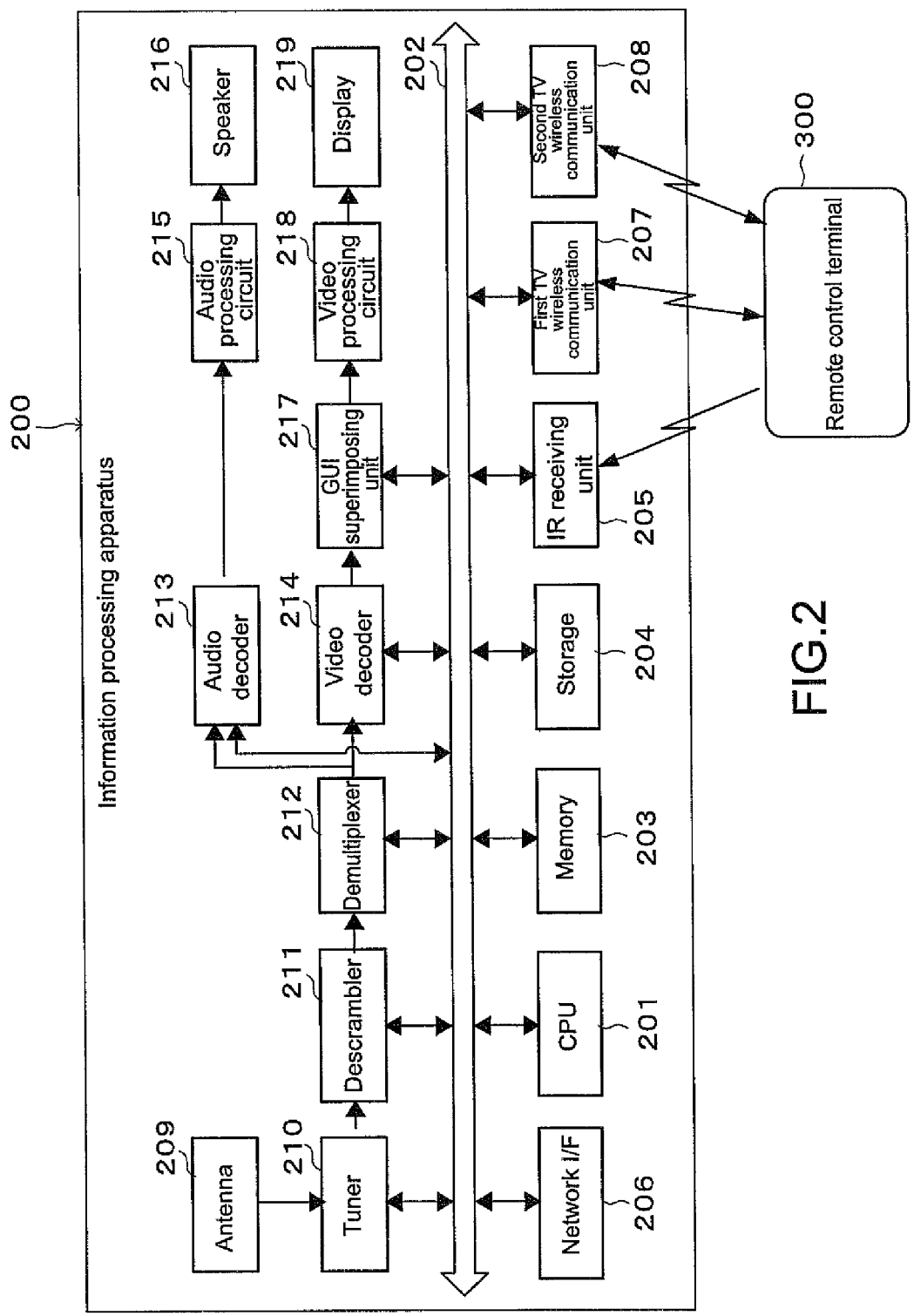
FIG. 2 is a diagram showing the hardware configuration of an information processing apparatus of FIG. 1.

FIG. 2 is a diagram showing the hardware configuration of the information processing apparatus 200.

In this embodiment, a case where a television receiver is used as the information processing apparatus 200 will be described.

The information processing apparatus 200 includes a CPU (Central Processing Unit) 201 (second controller), a bus 202, a memory 203, a storage 204, an IR receiving unit 205, a network I/F 206, a first TV wireless communication unit 207 (first apparatus-side wireless communication unit), and a second TV wireless communication unit 208 (second apparatus-side wireless communication unit). The information processing apparatus 200 further includes an antenna 209, a tuner 210, a descrambler 211, a demultiplexer 212, an audio decoder 213, a video decoder 214, an audio processing circuit 215, a speaker 216, a GUI (Graphical User Interface) superimposing unit 217, a video processing circuit 218, and a display 219.

In the information processing apparatus 200, the CPU 201 executes various kinds of processing according to programs stored in the memory 203 and the storage 204 connected via the bus 202. Further, the CPU 201 receives, as commands, infrared signals input from the remote control terminal 300 via the IR receiving unit 205. The CPU 201 controls operations of the respective units based on the commands.

The first TV wireless communication unit 207 interactively communicates with the remote control terminal 300 by using the first wireless communication system in conformity with a wireless communication standard using RF signals such as the RF4CE standard, for example.

The second TV wireless communication unit 208 interactively communicates with the remote control terminal 300 by using the second wireless communication system higher in speed than the first wireless communication system. As the second wireless communication system, for example, a wireless LAN in conformity with the IEEE 802.11b standard or the like may be used.

The antenna 209 receives digital broadcast signals and the like, and inputs the signals in the tuner 210.

The tuner 210 extracts a broadcast signal of a predetermined channel (for example, channel designated by the remote control terminal 300 through a user operation) from digital broadcast signals. The tuner 210 performs demodulation processing on the extracted broadcast signal to thereby obtain a transport stream of the predetermined channel, and outputs the transport stream to the descrambler 211.

The descrambler 211 descrambles the transport stream input from the tuner 210 by using a descrambler key. The descrambler key is prerecorded in a predetermined integrated circuit card (not shown) mounted in the information processing apparatus 200. The descrambler 211 outputs the descrambled transport stream to the demultiplexer 212.

The demultiplexer 212 demultiplexes audio data and video data from the descrambled transport stream input from the descrambler 211. The demultiplexer 212 outputs the demultiplexed audio data to the audio decoder 213, and outputs the demultiplexed video data to the video decoder 214.

The audio decoder 213 decodes the audio data input from the demultiplexer 212, and outputs the obtained audio data to the audio processing circuit 215.

The audio processing circuit 215 performs D/A (Digital/Analog) converting processing, amplification processing, and the like on the audio data input from the audio decoder 213. The audio processing circuit 215 outputs the obtained audio signal to the speaker 216.

The video decoder 214 decodes the video data input from the demultiplexer 212, and outputs the obtained video data to the GUI superimposing unit 217.

The GUI superimposing unit 217 superimposes graphic data such as OSD (On Screen Display) on the video data input from the video decoder 214, and outputs the video data to the video processing circuit 218.

The video processing circuit 218 performs predetermined image processing, D/A (Digital/Analog) converting processing, and the like on the video data input from the GUI superimposing unit 217, and output the obtained video signal to the display 219.

Further, similar to the above, operated by the remote control terminal 300, the CPU 201 receives digital broadcast signals, obtains a transport stream of a predetermined channel, and stores the transport stream in the storage 204 as video/audio data of a broadcast program.

As described above, the information processing apparatus 200 is capable of receiving digital broadcast signals, outputting the broadcast program from the display 219 and the speaker 216 such that a user may watch and listen to the broadcast program, recording the broadcast program in the storage 204, and the like.

Video-dedicated application programs for performing processing on video data are stored in the memory 203 or the storage 204. Examples of the video-dedicated application include an application for displaying video data transmitted from the remote control terminal 300 on a display, an application for accessing a service for recognizing an image and searching for information about a recognized object, and the like. Further, audio-dedicated application programs for performing processing on audio data are stored in the memory 203 or the storage 204. An example of the audio-dedicated application is an application for recognizing audio data transmitted from the remote control terminal 300, extracting a command to control the information processing apparatus 200 from the recognized data, and controlling the information processing apparatus 200. Another example of the audio-dedicated application is an application for recognizing audio data transmitted from the remote control terminal 300, extracting a command to control the information processing apparatus 200 from the recognized data, and accessing a search service by using the recognized character string.

[Configuration of Remote Control Terminal 300]

Next, the configuration of the remote control terminal 300 will be described.

FIG. 3 to FIG. 6 are external views of the remote control terminal 300.

Figure 3:
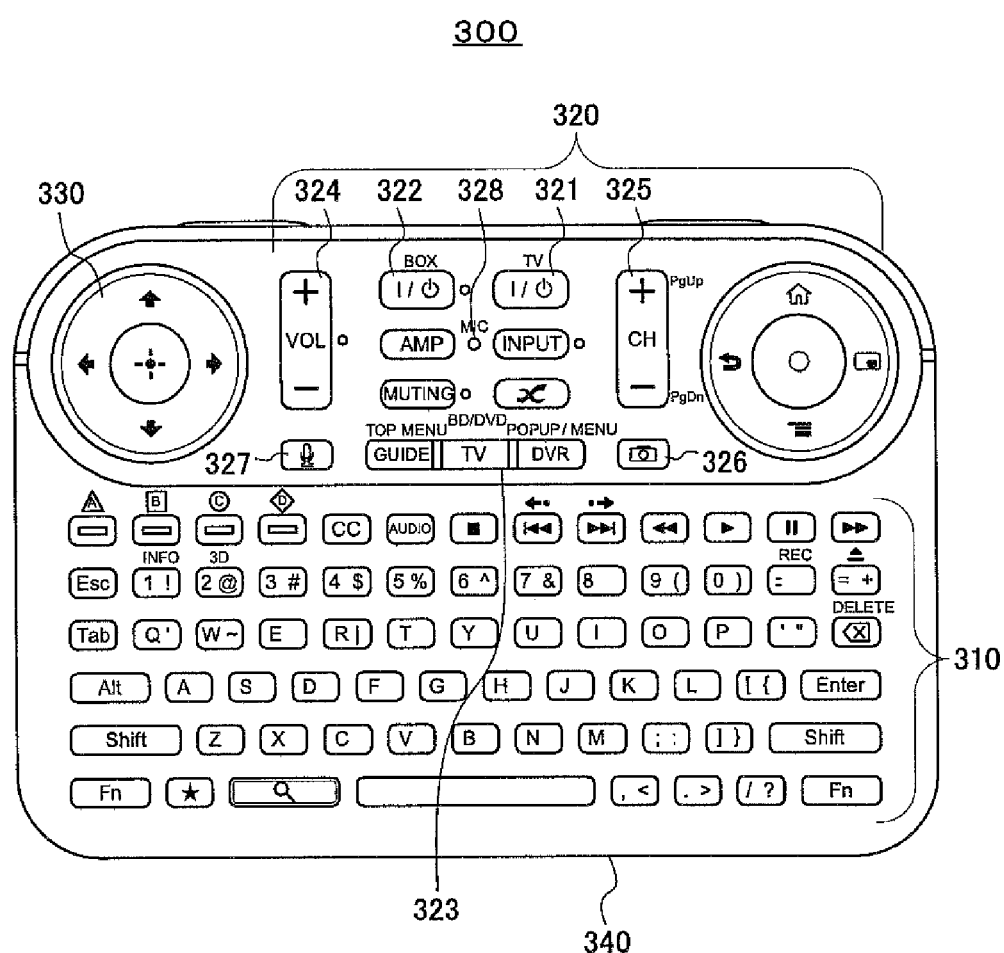
FIG. 3 is a side view showing a remote control terminal of FIG. 1, seen from the front side.

As shown in FIG. 3, a keyboard 310, remote control keys 320 (input unit), a pointing device 330, and the like are provided at least on the front surface of the remote control terminal 300. The keyboard 310 includes a plurality of keys for inputting letters and the like. The remote control keys 320 include a main power source button 321 for the television receiver, a main power source button 322 for a set-top box, operation buttons 323 for BD (blu-ray)/DVD (Digital Versatile Disc), an audio volume correction button 324, a channel switch button 325, a video-dedicated application startup button 326, an audio-dedicated application startup button 327, and the like. In the remote control keys 320, a microphone hole 328 is provided.

Figure 4:
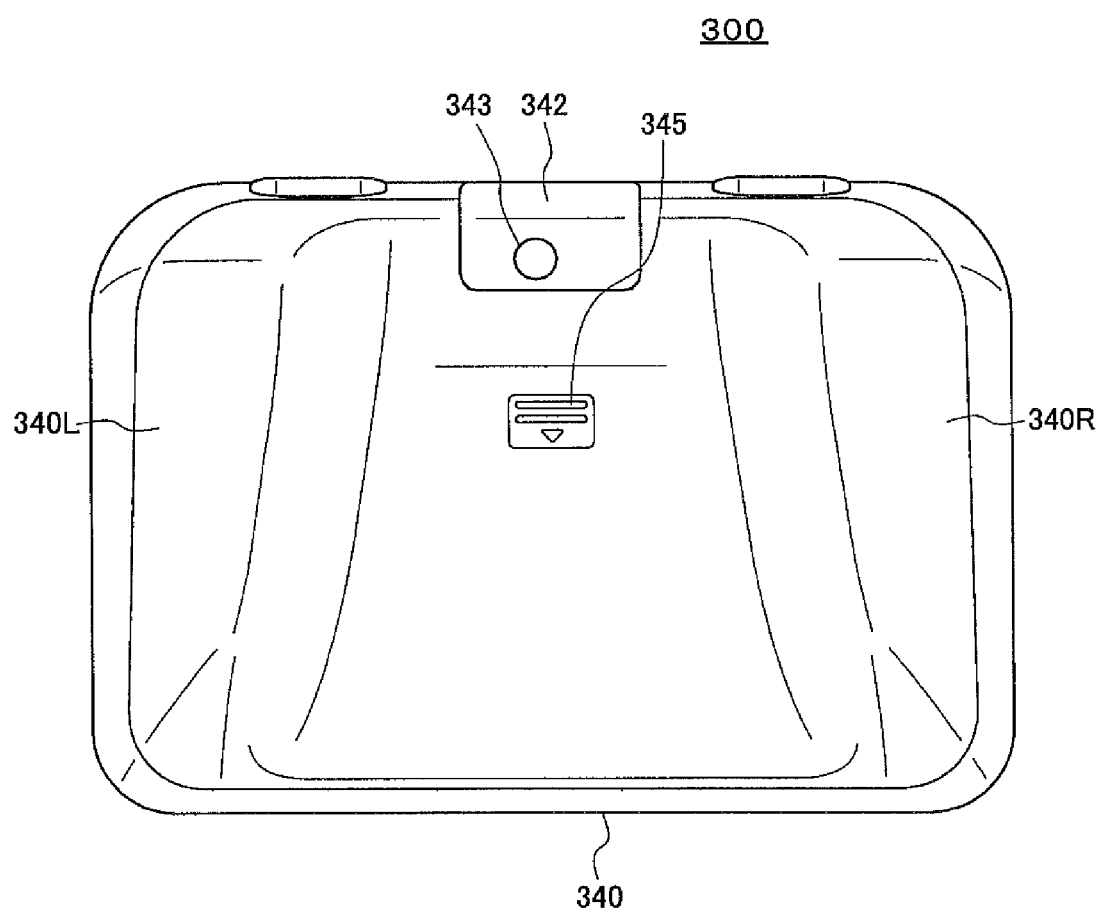
FIG. 4 is a side view showing the remote control terminal of FIG. 3, seen from the back side.
Figure 5:
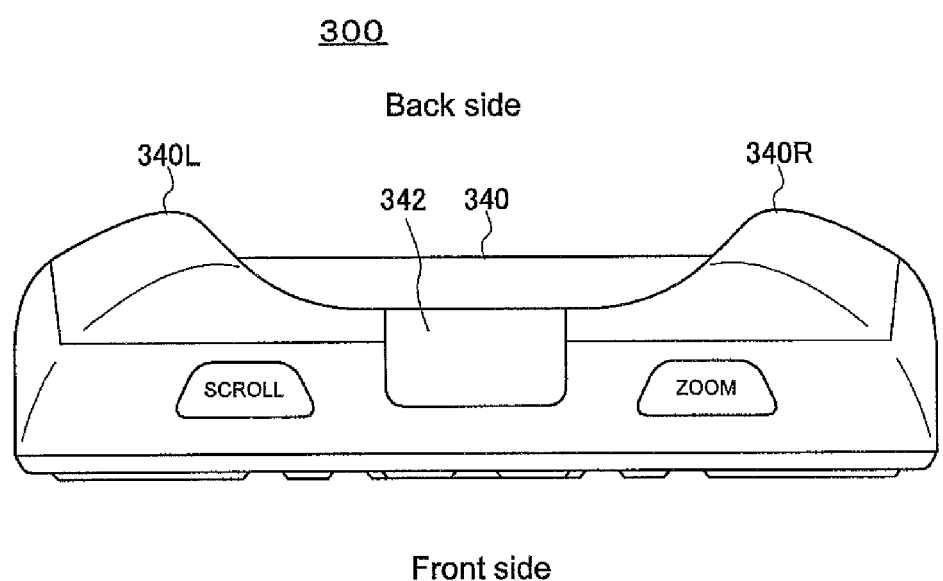
FIG. 5 is a side view showing the remote control terminal of FIG. 3, seen from the bottom side.
Figure 6:
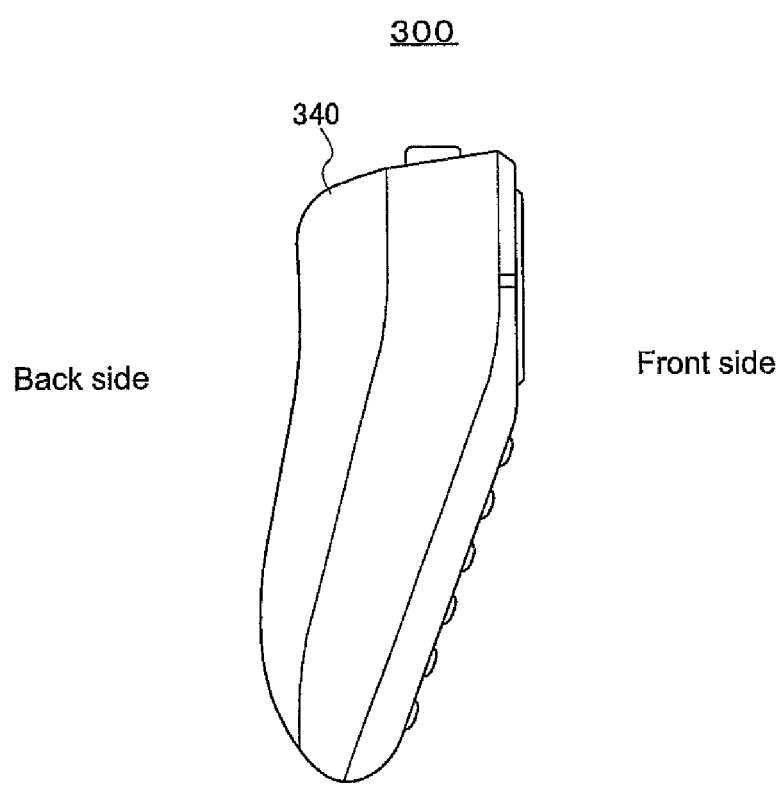
FIG. 6 is a side view showing the remote control terminal of FIG. 3, seen from the left side.

As shown in FIG. 4 and FIG. 5, a housing 340 of the remote control terminal 300 has left and right swell portions. Because of this shape, a user may hold the left and right swell portions with his left and right hands without difficulty. Such left and right swell portions serve as a pair of left and right grip portions 341L, 341R. An IR transmissive window 342 of an IR transmitting unit (355 in FIG. 7) is provided from a top surface to a back surface of the housing 340. The IR transmissive window 342 is covered by an IR transmissive cover. Further, a lens hole 343 of the camera unit (356 in FIG. 7) is provided on the midpoint of the pair of left and right grip portions 341L, 341R on the back surface of the housing 340. The lens hole 343 is provided on, specifically, the cover of the IR transmissive window 342. Further, a sliding cover 345 for attaching/detaching a battery (354 in FIG. 7) is provided on the midpoint of the pair of left and right grip portions 341L, 341R on the back surface of the housing 340. The battery is attached on a position, which emergences when the sliding cover 345 is open.

FIG. 7 is a diagram showing the hardware configuration of the remote control terminal 300.

The remote control terminal 300 includes a CPU 351 (first controller), a first remote-control wireless-communication unit 352 (first terminal-side wireless-communication unit), a second remote-control wireless-communication unit 353 (second terminal-side wireless-communication unit), a sub controller 354 (first controller), an IR oscillator 355, a camera unit 356, an encoder 357, a non-volatile storage 358, the remote control keys 320 (input unit), and the keyboard 310. The remote control terminal 300 further includes the pointing device 330, a microphone unit 361, a triaxial acceleration censor 362 (motion detection unit), a general interface 363, a battery 364, a first power source circuit 365, a second power source circuit 366, and the like.

The CPU 351 entirely controls the respective blocks included in the remote control terminal 300, performs various kinds of arithmetic processing, and controls data transfer between the respective blocks.

The triaxial acceleration censor 362 detects accelerations in the triaxial directions (directions in XYZ axes) and supplies the accelerations to the CPU 351 such that the CPU 351 detects the posture, motion, and the like of the remote control terminal 300. The CPU 351 A/D-converts the output results in the respective three axes from the triaxial acceleration censor 362, and obtains the A/D-converted results.

The general interface 363 is an interface capable of reading/writing data out of/in a removal media in order to, for example, upgrade firmware and other purposes. The general interface 363 is, specifically, a USB interface or the like, but is not limited thereto in the present technology.

The camera unit 356 is used to take a video to be transmitted to the information processing apparatus 200. The camera unit 356 includes an image sensor such as a CMOS (Complementary Metal Oxide Semiconductor) image sensor, an A/D converter A/D-converting the output from the image sensor, and the like.

The encoder 357 encodes the video data took by the camera unit 356 to thereby obtain typical encoded data such as JPEG (Joint Photographical Experts Group) data.

The non-volatile storage 358 stores the encoded video data and the like.

The IR oscillator 355 oscillates IR (infrared) signals. The IR (infrared) signals are pulse-modulated so as to include commands to control to the information processing apparatus 200.

The pointing device 330 inputs coordinate data and the like. For example, the pointing device 330 inputs pointing-cursor operations on the display of the information processing apparatus 200. The pointing device 330 is an optical mouse or the like.

The microphone unit 361 mainly collects user's voices. The microphone unit 361 captures sounds, converts the sounds to electric signals, and supplies the electric signals to the CPU 351. More specifically, the microphone unit 361 includes a microphone 371 and an amplifier-and-A/D-converter circuit 372. The amplifier-and-A/D-converter circuit 372 amplifies the output from the microphone 371, and A/D-converts the amplified result.

The first remote-control wireless-communication unit 352 interactively communicates with the information processing apparatus 200 by using a first wireless communication system in conformity with a wireless communication standard using RF signals such as, for example, the RF4CE standard.

The second remote-control wireless-communication unit 353 interactively communicates with the information processing apparatus 200 by using a second wireless communication system higher in speed than the first wireless communication system. As the second wireless communication system, for example, a wireless LAN in conformity with the IEEE 802.11b standard or the like may be used.

The sub controller 354 is a circuit controlling the second remote-control wireless-communication unit 353, the camera unit 356, the encoder 357, and the like. Note that, in this embodiment, the first remote-control wireless-communication unit 352 is controlled by the CPU 351. Note that, the CPU 351 enabling much higher-speed computing may control the second remote-control wireless-communication unit 353, the camera unit 356, the encoder 357, and the like. In this case, it is not necessary for the remote control terminal 300 to include the sub controller 354.

The battery 364 supplies necessary powers to the entire remote control terminal 300.

The first power source circuit 365 generates voltage, which may be used by the CPU 351, from the power from the battery 364, and supplies the voltage to the CPU 351.

The second power source circuit 366 generates voltage, which may be used by the sub controller 354, from the power from the battery 364, and supplies the voltage to the sub controller 354. The second power source circuit 366 includes a control input port. The CPU 351 inputs ON/OFF-switch-control signals in the control input port. The second power source circuit 366 is capable of switching ON/OFF of power supply to the sub controller 354 in response to the switch-control signals input in the control input port.

Operations in this Embodiment

Next, operations of the remote control system 100 of this embodiment will be described.

In the remote control system 100, the remote control terminal 300 transmits video data obtained by the camera unit 356 of the remote control terminal 300 and audio data obtained by the microphone unit 361 to the information processing apparatus 200 by using the second wireless communication system.

In order to, as described above, transmit video data to the information processing apparatus 200 by the remote control terminal 300, it is necessary to operate the second remote-control wireless-communication unit 353 and the camera unit 356. Similarly, in order to transmit audio data to the information processing apparatus 200 by the remote control terminal 300, it is necessary to operate the second remote-control wireless-communication unit 353 and the microphone unit 361. However, the frequency of transmission of video data or audio data is not so high in the entire operating time of the remote control terminal 300. Therefore, in order to reduce power consumption, it is important to start the second remote-control wireless-communication unit 353, the camera unit 356, and the microphone unit 361 after generations of video data/audio data transmission instructions.

In the remote control terminal 300, the CPU 351 recognizes that the video-dedicated application startup button 326 or the audio-dedicated application startup button 327 is operated by a user, whereby the video data/audio data transmission instruction is substantially generated. For example, typically, when the CPU 351 recognizes that the video-dedicated application startup button 326, which is allocated to the execution of a video-dedicated application, is operated, the CPU 351 starts the second remote-control wireless-communication unit 353 and the camera unit 356 at the time of the recognition. However, this may induce unnecessary power consumption. Next, a reason thereof will be described.

The video-dedicated application startup button 326 and the audio-dedicated application startup button 327 may sometimes be erroneously operated. For example, under a setting in which the second remote-control wireless-communication unit 353 and the camera unit 356 are started because of a single operation of the video-dedicated application startup button 326, every time the video-dedicated application startup button 326 is erroneously operated, unnecessary power consumption occurs in the second remote-control wireless-communication unit 353 and the camera unit 356. Note that, in this case, a user notices an occurrence of an erroneous operation because an image took by the camera unit 356 is displayed on the display 219 of the information processing apparatus 200. The user inputs operations to stop the second remote-control wireless-communication unit 353 and the camera unit 356, to thereby reduce the unnecessary power consumption as much as possible. However, such a situation does not apply to a case where a power is not supplied to the information processing apparatus 200, or a case where wireless communications with the information processing apparatus 200 is not established. In such cases, it is not easy for a user to recognize that the second remote-control wireless-communication unit 353 and the camera unit 356 are being started. As a result, the unnecessary power consumption may increase to the measurable amount. This is one problem to be solved by this embodiment.

[Operation 1]

Next, operations in a case where the video-dedicated application startup button 326 of the remote control terminal 300 of the remote control system 100 of this embodiment is operated will be described.

Figure 8:
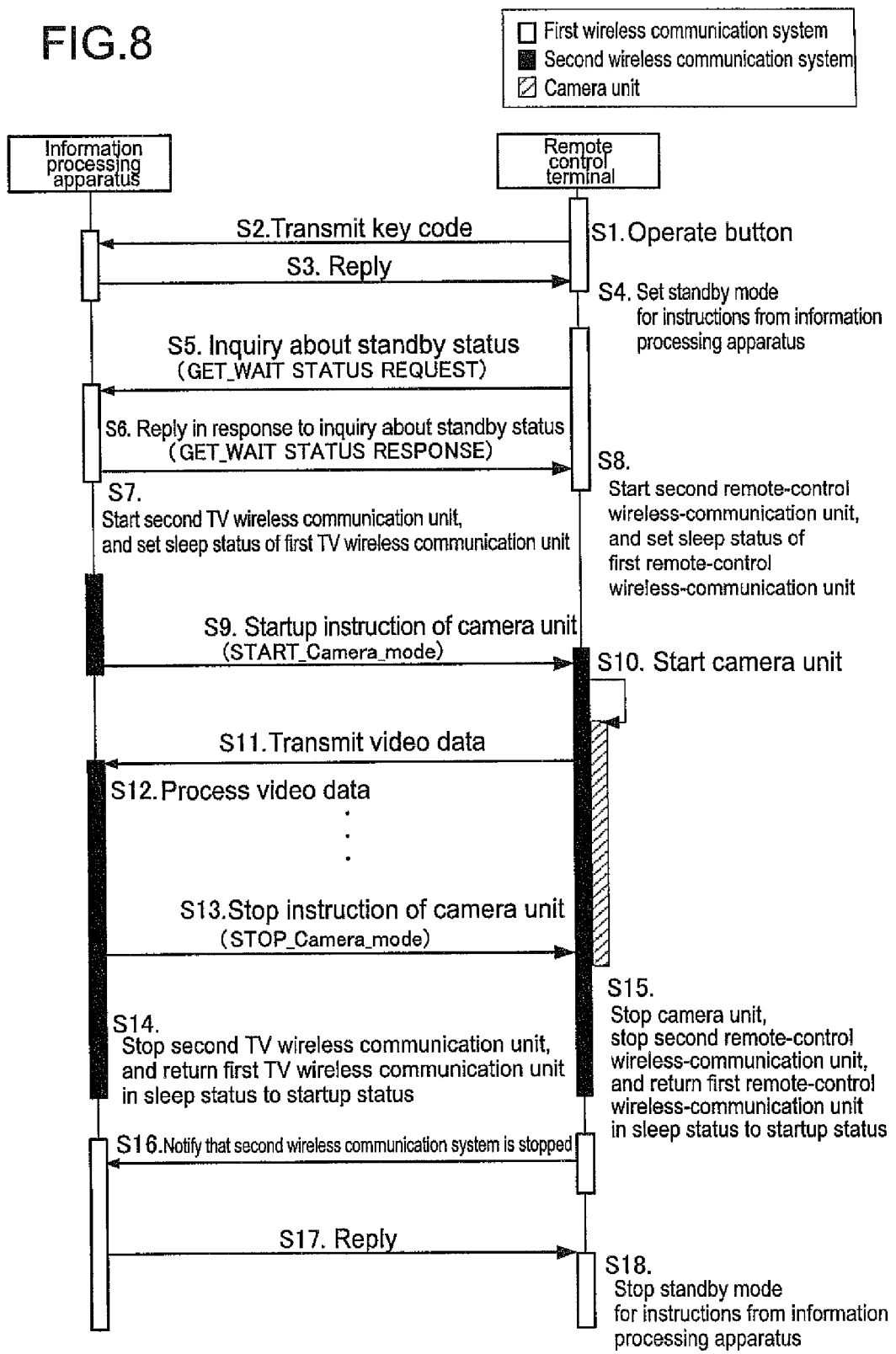
FIG. 8 is a diagram showing a processing flow of the remote control system in a case where a video-dedicated application startup button of the remote control terminal is operated.

FIG. 8 is a diagram showing a processing flow of the remote control system 100 in a case where the video-dedicated application startup button 326 of the remote control terminal 300 is operated.

Note that, on the premise of the operations, the information processing apparatus 200 is connected with the remote control terminal 300 by using the first wireless communication system. In the initial status, the second wireless communication system is in the stop status. In the initial status, the camera unit 356 and the microphone unit 361 of the remote control terminal 300 are also in the stop status. Here, the "stop status" includes the status where a power is not supplied. "Startup" and to "start" include the status where a power is supplied.

S1. The video-dedicated application startup button 326 of the remote control terminal 300 is operated.

S2. The CPU 351 of the remote control terminal 300 transmits the key code allocated to the operated video-dedicated application startup button 326 to the information processing apparatus 200 via the first wireless communication system.

S3. The CPU 201 of the information processing apparatus 200 obtains the key code transmitted from the remote control terminal 300. Then, the CPU 201 returns a reply to the remote control terminal 300 via the first wireless communication system. After that, the CPU 201 of the information processing apparatus 200 exchanges information, which is necessary to establish a connection with the remote control terminal 300 via the second wireless communication system, with the remote control terminal 300 by using the first wireless communication system (negotiation).

S4. The CPU 351 of the remote control terminal 300 receives the reply. Then, the CPU 351 sets a standby mode for instructions from the information processing apparatus 200.

S5. When the CPU 351 of the remote control terminal 300 sets the standby mode, at the timing when a predetermined time period (for example, 4 seconds) passes after receiving the reply signal, the CPU 351 sends an inquiry about the standby status (GET_WAIT STATUS REQUEST) to the information processing apparatus 200 via the first wireless communication system at a constant frequency.

S6. In a case where the negotiation is not completed at the time when receiving the inquiry (GET_WAIT STATUS REQUEST), the CPU 201 of the information processing apparatus 200 sends a reply, which instructs to continue the standby mode as it is (GET_WAIT STATUS RESPONSE), to the remote control terminal 300 via the first wireless communication system. In this case, the remote control terminal 300 continues the standby mode as it is. Further, in a case where the negotiation is completed at the time when receiving the inquiry (GET_WAIT STATUS REQUEST), the CPU 201 of the information processing apparatus 200 sends a reply, which instructs to start the second remote-control wireless-communication unit 353 (first startup instruction) and instructs to continue the standby mode (GET_WAIT STATUS RESPONSE), to the remote control terminal 300 via the first wireless communication system. Note that, S6 in FIG. 8 shows the latter.

S7. After that, the CPU 201 of the information processing apparatus 200 starts the second TV wireless communication unit 208, and sets the sleep status of the first TV wireless communication unit 207.

S8. Receiving the reply, which instructs to start the second remote-control wireless-communication unit 353 (first startup instruction) and instructs to continue the standby mode (GET_WAIT STATUS RESPONSE), the CPU 351 of the remote control terminal 300 continues the standby mode, starts the second remote-control wireless-communication unit 353, and sets the sleep status of the first remote-control wireless-communication unit 352. As a result, the information processing apparatus 200 is connected with the remote control terminal 300 via the second wireless communication system.

Note that the "sleep status" of the wireless communication units means a status where the power consumption is reduced by, for example, stopping receiving operations, and where receiving operations may be started immediately in response to an instruction to return from the sleep status, and other status.

S9. The CPU 201 of the information processing apparatus 200 sends a startup instruction of the camera unit 356 (START_Camera_mode) (second startup instruction) to the remote control terminal 300 by using the second wireless communication system.

S10. In the remote control terminal 300, the received startup instruction of the camera unit 356 (second startup instruction) is supplied to the sub controller 354. In response to the startup instruction of the camera unit 356 (second startup instruction), the sub controller 354 starts the camera unit 356. As a result, the camera unit 356 starts to take images.

S11. The encoder 357 encodes a video took by the camera unit 356 to thereby obtain still-image data such as JPEG data of, for example, a predetermined time period cycle. The sub controller 354 supplies the encoded still-image data to the second remote-control wireless-communication unit 353. The second remote-control wireless-communication unit 353 converts the encoded still-image data to wireless LAN packets, and transmits the wireless LAN packets to the information processing apparatus 200 via the second wireless communication system.

S12. The second TV wireless communication unit 208 of the information processing apparatus 200 receives the wireless LAN packets. The wireless LAN packets are decompressed, and encoded still-image data is obtained. After that, the video decoder 214 decodes the encoded still-image data, and continuously supplies the decoded still-image data to the display 219 via the GUI superimposing unit 217 and the video processing circuit 218. The display 219 displays the decoded still-image data. After that, for example, a user of the remote control terminal 300 operates a shutter button provided on the remote control terminal 300 at an arbitrary timing while viewing the video continuously displayed on the display 219. Then, the remote control terminal 300 transmits the key code corresponding to the shutter button to the information processing apparatus 200 via the second wireless communication system. The CPU 201 of the information processing apparatus 200 executes predetermined processing on the still-image data at the timing of obtainment of the key code, according to the video-dedicated application.

S13. The CPU 201 of the information processing apparatus 200 determines that a predetermined data transmission stop condition is established. Then, the CPU 201 sends an instruction to the remote control terminal 300 to stop the camera unit 356 (STOP_Camera_mode) via the second wireless communication system. Examples of the data transmission stop condition include a status, where the information processing apparatus 200 does not receive video data from the remote control terminal 300, continues for a predetermined continuous time period, and the like.

S14. After sending the instruction to the remote control terminal 300 to stop the camera unit 356 (STOP_Camera_mode), the CPU 201 of the information processing apparatus 200 stops the second TV wireless communication unit 208, and returns the first TV wireless communication unit 207 in the sleep status to the startup status.

S15. Meanwhile, in response to the instruction to stop the camera unit 356 (STOP_Camera_mode), the CPU 351 of the remote control terminal 300 stops the camera unit 356, stops the second remote-control wireless-communication unit 353, and returns the first remote-control wireless-communication unit 352 in the sleep status to the startup status.

S16. After that, the CPU 351 of the remote control terminal 300 notifies the information processing apparatus 200 that the second wireless communication system is stopped by using the first wireless communication system.

S17. Receiving the notification that the second wireless communication system is stopped from the remote control terminal 300, the CPU 201 of the information processing apparatus 200 returns a reply to the notification to the remote control terminal 300 by using the first wireless communication system.

S18. In response to the reply, the CPU 351 of the remote control terminal 300 stops the standby mode for instructions from the information processing apparatus 200, and sets a standby mode for next key operations.

As described above, in this embodiment, even in a case where the video-dedicated application startup button 326 of the remote control terminal 300 is operated by a user, unless the remote control terminal 300 receives a startup instruction from the information processing apparatus 200, the second remote-control wireless-communication unit 353 and the camera unit 356 of the remote control terminal 300 are not started. Therefore, even if a user erroneously operates the video-dedicated application startup button 326 when a power is not supplied to the information processing apparatus 200, or when wireless communication with the information processing apparatus 200 is not established, the second remote-control wireless-communication unit 353 and the camera unit 356 are not started. As a result, unnecessary power consumption may be reduced.

[Operation 2]

Next, operations in a case where the audio-dedicated application startup button 327 of the remote control terminal 300 of the remote control system 100 in this embodiment is operated will be described.

Figure 9:
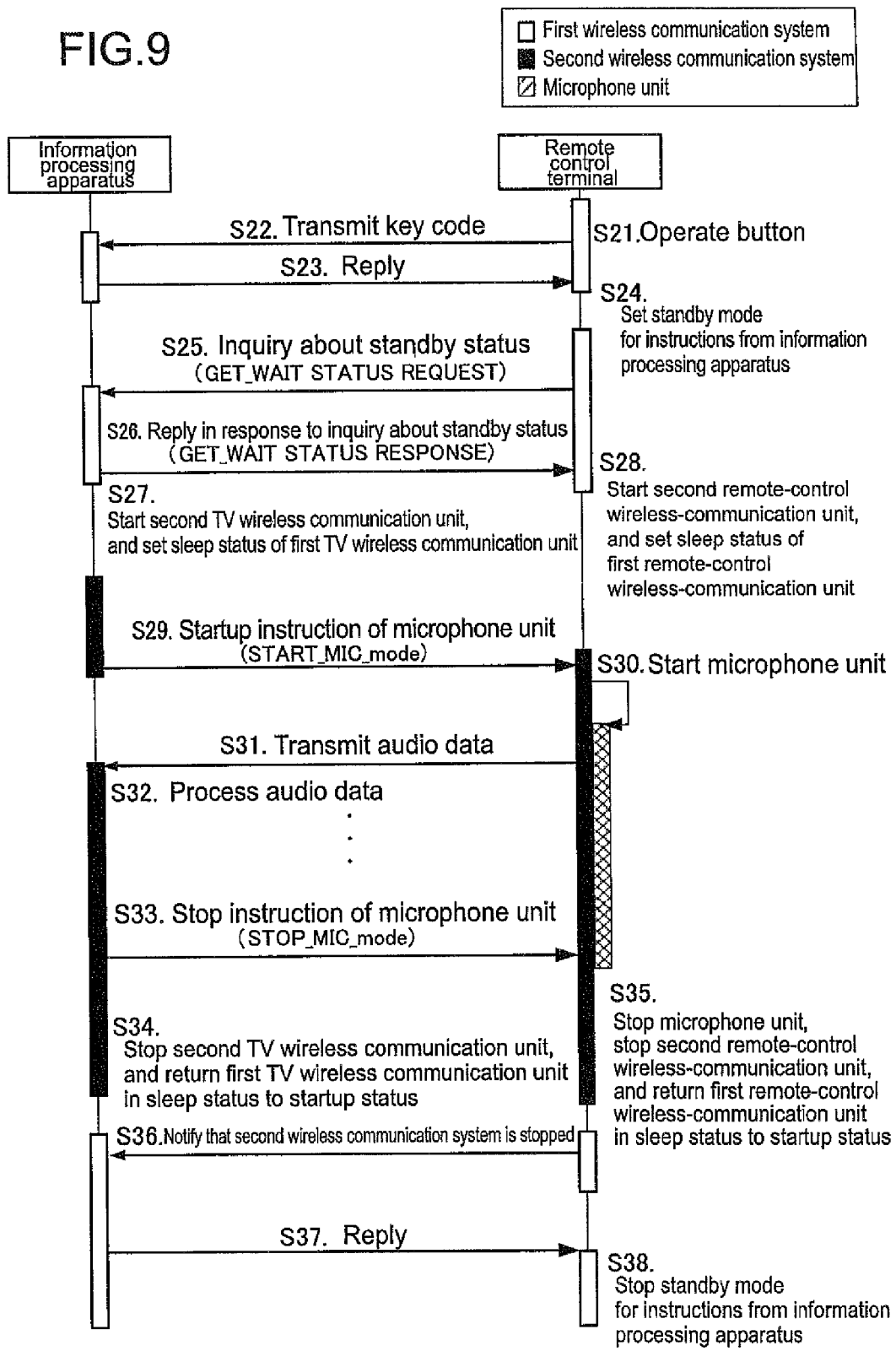
FIG. 9 is a diagram showing a processing flow of the remote control system in a case where an audio-dedicated application startup button of the remote control terminal is operated.

FIG. 9 is a diagram showing a processing flow in a case where the audio-dedicated application startup button 327 of the remote control terminal 300 is operated.

S21. The audio-dedicated application startup button 327 of the remote control terminal 300 is operated.

S22. The CPU 351 of the remote control terminal 300 transmits the key code allocated to the operated audio-dedicated application startup button 327 to the information processing apparatus 200 via the first wireless communication system.

S23. The CPU 201 of the information processing apparatus 200 obtains the key code transmitted from the remote control terminal 300. Then, the CPU 201 returns a reply to the remote control terminal 300 via the first wireless communication system. After that, the CPU 201 of the information processing apparatus 200 exchanges information, which is necessary to establish a connection with the remote control terminal 300 via the second wireless communication system, with the remote control terminal 300 by using the first wireless communication system (negotiation).

S24. The CPU 351 of the remote control terminal 300 receives the reply. Then, the CPU 351 sets a standby mode for instructions from the information processing apparatus 200.

S25. When the CPU 351 of the remote control terminal 300 sets the standby mode, at the timing when a predetermined time period (for example, 4 seconds) passes after receiving the reply signal, the CPU 351 sends an inquiry about the standby status (GET_WAIT STATUS REQUEST) to the information processing apparatus 200 via the first wireless communication system at a constant frequency.

S26. In a case where the negotiation is not completed at the time when receiving the inquiry (GET_WAIT STATUS REQUEST), the CPU 201 of the information processing apparatus 200 sends a reply, which instructs to continue the standby mode as it is (GET_WAIT STATUS RESPONSE), to the remote control terminal 300 via the first wireless communication system. In this case, the remote control terminal 300 continues the standby mode as it is. Further, in a case where the negotiation is completed at the time when receiving the inquiry (GET_WAIT STATUS REQUEST), the CPU 201 of the information processing apparatus 200 sends a reply, which instructs to start the second remote-control wireless-communication unit 353 (third startup instruction) and instructs to continue the standby mode (GET_WAIT STA- TUS RESPONSE), to the remote control terminal 300 via the first wireless communication system. Note that, S26 in FIG. 9 shows the latter.

S27. After that, the CPU 201 of the information processing apparatus 200 starts the second TV wireless communication unit 208, and sets the sleep status of the first TV wireless communication unit 207.

S28. Receiving the reply, which instructs to start the second remote-control wireless-communication unit 353 (third startup instruction) and instructs to continue the standby mode (GET_WAIT STATUS RESPONSE), the CPU 351 of the remote control terminal 300 continues the standby mode, starts the second remote-control wireless-communication unit 353, and sets the sleep status of the first remote-control wireless-communication unit 352. As a result, the information processing apparatus 200 is connected with the remote control terminal 300 via the second wireless communication system.

S29. The CPU 201 of the information processing apparatus 200 sends a startup instruction of the microphone unit 361 (START_MIC_mode) (fourth startup instruction) to the remote control terminal 300 by using the second wireless communication system.

S30. In response to the received startup instruction of the microphone unit 361 (fourth startup instruction), the CPU 351 of the remote control terminal 300 starts the microphone unit 361. As a result, the microphone unit 361 starts to collect sounds.

S31. The CPU 351 encodes audio data collected by the microphone unit 361. The sub controller 354 supplies the encoded audio data to the second remote-control wireless-communication unit 353. The second remote-control wireless-communication unit 353 converts the encoded audio data to wireless LAN packets, and transmits the wireless LAN packets to the information processing apparatus 200 via the second wireless communication system.

S32. The second TV wireless communication unit 208 of the information processing apparatus 200 receives the wireless LAN packets. The wireless LAN packets are decompressed, and encoded audio data is obtained. After that, the audio decoder 213 decodes the encoded audio data, and supplies the decoded audio data to the speaker 216 via the audio processing circuit 215. After that, the information processing apparatus 200 performs processing on the audio data according to audio-dedicated application programs. For example, the information processing apparatus 200 recognizes the audio data, extracts a command to control the information processing apparatus 200 from the recognized data, and controls the information processing apparatus 200. Alternatively, the information processing apparatus 200 recognizes the audio data, extracts a command to control the information processing apparatus 200 from the recognized data, and accesses a search service by using the recognized character string.

S33. The CPU 201 of the information processing apparatus 200 determines that a predetermined data transmission stop condition is established. Then, the CPU 201 sends an instruction to the remote control terminal 300 to stop the microphone unit 361 (STOP_MIC_mode) via the second wireless communication system. Examples of the data transmission stop condition include a status where the information processing apparatus 200 does not receive audio data from the remote control terminal 300 is for a predetermined continuous time period, and the like.

S34. After sending the instruction to the remote control terminal 300 to stop the microphone unit 361 (STOP_MIC_mode), the CPU 201 of the information processing apparatus 200 stops the second TV wireless communication unit 208, and returns the first TV wireless communication unit 207 in the sleep status to the startup status.

S35. Meanwhile, in response to the instruction to stop the microphone unit 361 (STOP_MIC_mode), the CPU 351 of the remote control terminal 300 stops the microphone unit 361, stops the second remote-control wireless-communication unit 353, and returns the first remote-control wireless-communication unit 352 in the sleep status to the startup status.

S36. After that, the CPU 351 of the remote control terminal 300 notifies the information processing apparatus 200 that the second wireless communication system is stopped by using the first wireless communication system.

S37. Receiving the notification that the second wireless communication system is stopped from the remote control terminal 300, the CPU 201 of the information processing apparatus 200 returns a reply to the notification to the remote control terminal 300 by using the first wireless communication system.

S38. In response to the reply, the CPU 351 of the remote control terminal 300 stops the standby mode for instructions from the information processing apparatus 200, and sets a standby mode for next key operations.

As described above, in this embodiment, even in a case where the audio-dedicated application startup button 327 of the remote control terminal 300 is operated by a user, unless the remote control terminal 300 receives a startup instruction from the information processing apparatus 200, the second remote-control wireless-communication unit 353 and the microphone unit 361 of the remote control terminal 300 are not started. Therefore, even if a user erroneously operates the audio-dedicated application startup button 327 when a power is not supplied to the information processing apparatus 200, or when wireless communication with the information processing apparatus 200 is not established, the second remote-control wireless-communication unit 353 and the microphone unit 361 are not started. As a result, unnecessary power consumption may be reduced.

[Operation 3]

In the above-mentioned operation 1, during the camera unit 356 is being operated, the remote control terminal 300 keeps transmitting video data to the information processing apparatus 200. Because of this, in a case where a user does not input an operation to instruct to stop taking images by the camera and the remote control terminal 300 is unoperated, the second remote-control wireless-communication unit 353 and the camera unit 356 keeps operating. As a result, unnecessary power consumption may increase. If a user does not wish to continue to transmit video data in the unoperated status of the remote control terminal 300, operated by the user, the remote control terminal 300 may previously store a preset matter in which data transmission is prohibited under an unoperated status.

FIG. 10 is a diagram showing a processing flow in a case where the video-dedicated application startup button 326 is operated under the condition in which prohibition of data transmission under an unoperated status is set.

Note that, on the premise of the operations, the information processing apparatus 200 is connected with the remote control terminal 300 by using the first wireless communication system. In the initial status, the second wireless communication system is in the stop status. In the initial status, the camera unit 356, the microphone unit 361, and the triaxial acceleration censor 362 of the remote control terminal 300 are also in the stop status.

The operations of S41 to S49 are similar to the operations of S1 to S9 of the operation 1, and description thereof will thus be omitted.

S50. Receiving the startup instruction of the camera unit 356 (START_Camera_mode), the CPU 351 of the remote control terminal 300 starts the triaxial acceleration censor 362, and starts the camera unit 356 via the sub controller 354. As a result, the triaxial acceleration censor 362 starts to detect accelerations in the triaxial directions, and the camera unit 356 starts to take images. In response to this, the CPU 351 of the remote control terminal 300 starts to detect occurrence/inoccurrence of the unoperated status of the remote control terminal 300 based on the outputs from the triaxial acceleration censor 362. For example, the CPU 351 of the remote control terminal 300 monitors the respective accelerations in the triaxial directions detected by the triaxial acceleration censor 362. If the time period, in which a predetermined status continues, is larger than a predetermined time period as a threshold, the CPU 351 of the remote control terminal 300 determines that the remote control terminal 300 is in the unoperated status. The predetermined status is a status where all the accelerations in the triaxial directions are smaller than a predetermined threshold. Note that, in the present technology, any determining method other than this determining method may be employed.

S51. The encoder 357 encodes a video took by the camera unit 356 to thereby obtain still-image data such as JPEG data of, for example, a predetermined time period cycle. The sub controller 354 supplies the encoded still-image data to the second remote-control wireless-communication unit 353. The second remote-control wireless-communication unit 353 converts the encoded still-image data to wireless LAN packets, and transmits the wireless LAN packets to the information processing apparatus 200 via the second wireless communication system.

S52. The second TV wireless communication unit 208 of the information processing apparatus 200 receives the wireless LAN packets, and decompresses the wireless LAN packets to thereby obtain encoded still-image data. After that, the video decoder 214 decodes the encoded still-image data, and continuously supplies the decoded still-image data to the display 219 via the GUI superimposing unit 217 and the video processing circuit 218. The display 219 displays the decoded still-image data. After that, the information processing apparatus 200 executes predetermined processing on the video data according to the video-dedicated application.

The CPU 201 of the information processing apparatus 200 determines that a predetermined data transmission stop condition is established. Then, the CPU 201 sends an instruction to the remote control terminal 300 to stop the camera unit 356 (STOP_Camera_mode) via the second wireless communication system (not shown). Examples of the data transmission stop condition include a status, where the information processing apparatus 200 does not receive video data from the remote control terminal 300, continues for a predetermined continuous time period, and the like.

S53. Note that, here, the following status will be described. That is, before the video data transmission is not performed for a predetermined time period, the CPU 351 of the remote control terminal 300 detects the unoperated status based on the output from the triaxial acceleration censor 362.

S54. In the case of detecting the unoperated status based on the output from the triaxial acceleration censor 362, the CPU 351 of the remote control terminal 300 stops the camera unit 356, stops the second remote-control wireless-communication unit 353, and returns the first remote-control wireless-communication unit 352 in the sleep status to the startup status. As the first remote-control wireless-communication unit 352 of the remote control terminal 300 in the sleep status returns to the startup status, the first TV wireless communication unit 207 of the information processing apparatus 200 in the sleep status also returns to the startup status (wakes up). As a result, the first wireless communication system is in the running status.

S55. After that, the CPU 351 of the remote control terminal 300 notifies the information processing apparatus 200 that the second wireless communication system is stopped by using the first wireless communication system.

S56. Receiving the notification that the second wireless communication system is stopped from the remote control terminal 300, the CPU 201 of the information processing apparatus 200 returns a reply to the notification to the remote control terminal 300 by using the first wireless communication system. The following operations are same as the operation 1.

As described above, in this embodiment, the CPU 351 of the remote control terminal 300 monitors the outputs from the triaxial acceleration censor 362 during video data transmission, determines the unoperated status of the remote control terminal 300, and stops the second remote-control wireless-communication unit 353 and the camera unit 356. As a result, in the status where the remote control terminal 300 is connected with the information processing apparatus 200 via the second wireless communication system and where the remote control terminal 300 is unoperated, the power consumption may be minimized.

Note that, the operation 3 describes the processing flow in the case where the video-dedicated application startup button 326 is operated. However, it is similar to the case where the video-dedicated application startup button 326 is operated.

Note that, the present technology is not limited to the above-described embodiment, and may be variously modified in the scope of the technological thought of the present technology.

It should be understood by those skilled in the art that various modifications, combinations, sub-combinations and alterations may occur depending on design requirements and other factors insofar as they are within the scope of the appended claims or the equivalents thereof.

What is claimed is:

1. A remote control terminal, comprising:
   a first terminal-side wireless-communication unit configured to interactively communicate with an information processing apparatus by using a first wireless communication system;
   a second terminal-side wireless-communication unit configured to interactively communicate with the information processing apparatus by using a second wireless communication system, the second wireless communication system being higher in speed than the first wireless communication system;
   a camera unit configured to obtain video data; and
   a first controller configured to control the first terminal-side wireless-communication unit to send a request to the information processing apparatus to use the second wireless communication system, via the first wireless communication system, and
   to receive a first startup instruction replied from the information processing apparatus to start the second terminal-side wireless communication unit.

2. The remote control terminal according to claim 1, further comprising:
an input unit configured to receive, from a user of said remote control terminal, an input of an instruction to execute processing of the video data obtained by the camera unit, wherein
the first controller is configured
to send the request in response to the input from the user.

3. The remote control terminal according to claim 1, wherein
the first controller is configured
to control the second terminal-side wireless-communication unit to receive a second startup instruction via the second wireless communication system, the second startup instruction being generated by the information processing apparatus after generating the first startup instruction, and
to start the camera unit.

4. The remote control terminal according to claim 3, wherein
the first controller is configured to set a sleep status of the first terminal-side wireless-communication unit, in a case where the first controller starts the second terminal-side wireless-communication unit.

5. The remote control terminal according to claim 4, wherein
the first controller is configured
to control the second terminal-side wireless-communication unit to receive a stop instruction via the second wireless communication system, the stop instruction being generated by the information processing apparatus,
to stop the second terminal-side wireless-communication unit and the camera unit, and
to return the first terminal-side wireless-communication unit in the sleep status to a startup status.

6. A remote control terminal, comprising:
a first terminal-side wireless-communication unit configured to interactively communicate with an information processing apparatus by using a first wireless communication system;
a second terminal-side wireless-communication unit configured to interactively communicate with the information processing apparatus by using a second wireless communication system, the second wireless communication system being higher in speed than the first wireless communication system;
a camera unit configured to obtain video data;
a motion detection unit configured to detect a motion of the remote control terminal, and
a first controller is configured
to determine an unoperated status of the remote control terminal based on a detection result by the motion detection unit, and
to control the second terminal-side wireless-communication unit to send, in a case where the unoperated status is determined, a notification to the information processing apparatus such that the information processing apparatus sends a stop instruction, via the second wireless communication system, to stop the second terminal-side wireless-communication unit.

7. A remote control terminal, comprising:
a first terminal-side wireless-communication unit configured to interactively communicate with an information processing apparatus by using a first wireless communication system;
a second terminal-side wireless-communication unit configured to interactively communicate with the information processing apparatus by using a second wireless communication system, the second wireless communication system being higher in speed than the first wireless communication system;
a microphone unit configured to obtain audio data; and
a first controller configured to control the first terminal-side wireless-communication unit to send a request to the information processing apparatus to use the second wireless communication system, via the first wireless communication system, and
to receive a third startup instruction replied from the information processing apparatus to start the second terminal-side wireless communication unit.

8. The remote control terminal according to claim 7, further comprising:
an input unit configured to receive, from a user of said remote control terminal, an instruction to transmit the audio data obtained by the microphone unit to the information processing apparatus by using the second wireless communication system, wherein
the first controller is configured
to send the request in response to the instruction from the user.

9. The remote control terminal according to claim 7, wherein
the first controller is configured
to control the second terminal-side wireless-communication unit to receive a fourth startup instruction via the second wireless communication system, the fourth startup instruction being generated by the information processing apparatus after generating the third startup instruction, and
to start the microphone unit.

10. The remote control terminal according to claim 9, wherein
the first controller is configured to set a sleep status of the first terminal-side wireless-communication unit, in a case where the first controller starts the second terminal-side wireless-communication unit.

11. The remote control terminal according to claim 10, wherein
the first controller is configured
to control the second terminal-side wireless-communication unit to receive a stop instruction via the second wireless communication system, the stop instruction being generated by the information processing apparatus,
to stop the second terminal-side wireless-communication unit and the microphone unit, and
to return the first terminal-side wireless-communication unit in the sleep status to a startup status.

12. A remote control terminal, comprising:
a first terminal-side wireless-communication unit configured to interactively communicate with an information processing apparatus by using a first wireless communication system;
a second terminal-side wireless-communication unit configured to interactively communicate with the information processing apparatus by using a second wireless communication system, the second wireless communication system being higher in speed than the first wireless communication system;
a microphone unit configured to obtain audio data;
a motion detection unit configured to detect a motion of the remote control terminal, and
a first controller configured
to determine an unoperated status of the remote control terminal based on a detection result by the motion detection unit, and
to control the second terminal-side wireless-communication unit to send, in a case where the unoperated status is determined, a notification to the information processing apparatus such that the information processing apparatus sends a stop instruction, via the second wireless communication system, to stop the second terminal-side wireless-communication unit.

13. An information processing apparatus, comprising:
a first apparatus-side wireless-communication unit configured to interactively communicate with a remote control terminal by using a first wireless communication system;
a second apparatus-side wireless-communication unit configured to interactively communicate with the remote control terminal by using a second wireless communication system, the second wireless communication system being higher in speed than the first wireless communication system; and
a second controller configured to control the first apparatus-side wireless communication unit
to receive a request to use the second wireless communication system sent from the remote control terminal,
to send a first startup instruction to the remote control terminal to start the second terminal-side wireless-communication unit, via the first wireless communication system.

14. The information processing apparatus according to claim 13, wherein
the second controller is configured to control the second apparatus-side wireless communication unit to send, after sending the first startup instruction, a second startup instruction to the remote control terminal to start the camera unit of the remote control terminal, via the second wireless communication system.

15. The information processing apparatus according to claim 14, wherein
the second controller is configured to control the second apparatus-side wireless-communication unit to send, via the second wireless communication system, a stop instruction to the remote control terminal
to stop, in a case where, when the information processing apparatus is connected with the remote control terminal via the second wireless communication system, a status, where the information processing apparatus fails to receive the video data from the remote control terminal, continues for a predetermined continuous time period, the second terminal-side wireless-communication unit and the camera unit of the remote control terminal, and
to return the first terminal-side wireless-communication unit in the sleep status to a startup status.

16. The information processing apparatus according to claim 13, wherein
the second controller is configured to control the first apparatus-side wireless-communication unit
to receive a request to use the second wireless communication system sent from the remote control terminal, the remote control terminal sending the request when the remote control terminal receives, as a trigger, from a user, an input of an instruction to execute processing of audio data obtained by a microphone unit provided in the remote control terminal, and
to send a third startup instruction to the remote control terminal to start the second terminal-side wireless-communication unit, via the first wireless communication system.

17. The information processing apparatus according to claim 16, wherein
the second controller is configured to control the second apparatus-side wireless communication unit to send, after sending the third startup instruction, a fourth startup instruction to the remote control terminal to start the microphone unit of the remote control terminal, via the second wireless communication system.

18. The information processing apparatus according to claim 17, wherein
the second controller is configured to control the second apparatus-side wireless-communication unit to send, via the second wireless communication system, a stop instruction to the remote control terminal
to stop, in a case where, when the information processing apparatus is connected with the remote control terminal via the second wireless communication system, a status, where the information processing apparatus fails to receive the audio data from the remote control terminal, continues for a predetermined continuous time period, the second terminal-side wireless-communication unit and the microphone unit of the remote control terminal, and
to return the first terminal-side wireless-communication unit in the sleep status to a startup status.

19. The information processing apparatus according to claim 13, wherein
the remote control terminal sends the request after the remote control terminal receives from a user, an input of an instruction to execute processing of video data obtained by a camera unit provided in the remote control terminal.

* * * * *